Oct. 17, 1961     S. M. SCHWARTZ     3,004,895
DIAPER RASH PREVENTATIVE
Filed April 17, 1959
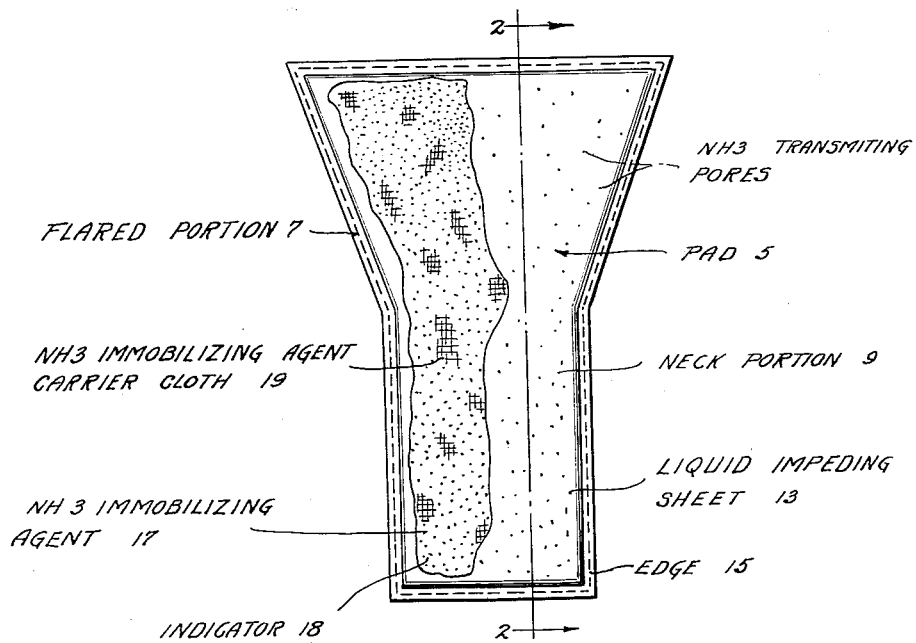
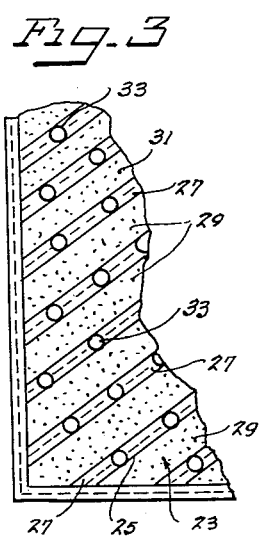
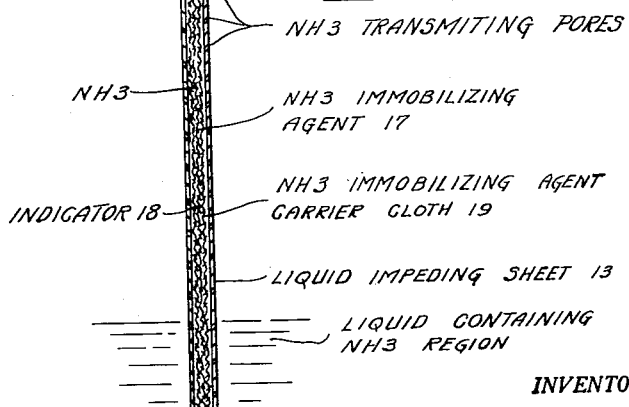
INVENTOR.
SAMUEL M. SCHWARTZ 3,004,895
DIAPER RASH PREVENTATIVE
Samuel M. Schwartz, Peoria, Ill.
(6633 Fiesta Drive, El Paso, Tex.)
Filed Apr. 17, 1959, Ser. No. 807,122
14 Claims. (Cl. 167—84)

The present invention generally relates to an ammonia-absorbing means and more particularly relates to a diaper rash preventative means and deodorizer for diapers, diaper pails, and the like.

Most babies have relatively sensitive skins, particularly in the genital region, which is especially subject to diaper rash. The causative agent of diaper rash is usually ammonia, which is formed in the diaper and wet bedclothes by bacteria, particularly *Bacterium ammoniagenes*, or the like, acting upon the urine. Such bacteria break down the nitrogen-containing constituents in the urine to ammonia. Ammonia, both in the form of gas and dissolved in an aqueous system, such as urine, is well known to be irritating to human skin, inasmuch as the ammonia gas is a desiccant and the ammonia in solution is a base.

Moreover, the sharp and disagreeable odor of ammonia gas, due at least in part to its irritating effect on the mucous membranes of the nasal passages, attests the action of this gas on human skin. Accordingly, pronounced susceptibility of the sensitive baby skin in the genital region to irritation by ammonia will be readily understood.

A number of methods have been proposed for the prevention or treatment of diaper rash and other skin irritations produced by ammonia and/or for the alleviation or prevention of the irritating odor caused by the formation of ammonia from urine and associated with the use of diapers, diaper pails and the like. However, in most instances conventional methods for such prevention, treatment and alleviation are relatively time-consuming, expensive and/or are relatively ineffective for the intended purposes.

Some leading medical autorities frequently advise for the treatment of diaper rash a complicated time-consuming procedure, including the steps of boiling the diapers for an extended period of time, followed by soaking the diapers in a solution of boric acid or similar antiseptic solution for an hour or so, and then wringing the diapers out and hanging them up to dry, preferably in the sun where the ultraviolet radiations have a sterilizing effect. This procedure is designed to kill the bacteria causing the ammonia formation. Alternatively, some medical authorities recommend the use of a special bacterial antiseptic on the diapers for the same purpose. Inasmuch as a relatively large number of diapers are utilized per day, especially for younger infants who are particularly prone to suffer from diaper rash, it will be understood that these procedures may be relatively expensive. Moreover, they have been found to be somewhat unreliable in eliminating diaper rash.

A method and means have now been discovered for readily eliminating diaper rash, as well as other skin irritations of which ammonia is a contributive or causative agent, and, at the same time, substantially removing the odor which is irritating to infant and parent alike and which is largely the result of the production of ammonia gas. In contrast to most conventional diaper rash preventative means which are directed to the destruction of ammonia-forming bacteria, a difficult task, the present invention is directed to the rapid immobilization of ammonia as it is formed, so that the ammonia does not have an opportunity to irritate the skin. The undesirable odors associated with the release of ammonia are thereby eliminated so that the invention also involves deodorizing.

In accordance with the method of the present invention, an ammonia-immobilizing agent is utilized in a suitable form to trap and retain ammonia emanating from a liquid-containing environment. The ammonia-immobilizing agent is preferably disposed adjacent the genital region of the baby but is separated from contact with the urine by a liquid-impeding barrier, which insures the integrity of the ammonia-immobilizing agent. The barrier is, however, readily permeable to the passage therethrough of ammonia gas so that ammonia immobilizing can readily proceed. Accordingly, the construction of the present invention includes the ammonia-immobilizing agent and liquid-impeding barrier.

It should be understood that the present invention is not limited to the prevention of diaper rash but, instead, may be utilized wherever it is advantageous to immobilize ammonia gas, e.g., in chemical processes, in deodorizing systems, diaper pails, etc. Thus, various embodiments of the invention have particular application as diaper pail deodorizers and liners.

When utilized for diaper rash prevention, however, the construction of the present invention is preferably in the form of a moisture-resistant ammonia-permeable packet or envelope, sealed within which is the ammonia-immobilizing agent. In use, the envelope may be disposed either directly against the body of the infant in the genital region or may be positioned within the folds of one or more diapers so as to be adjacent the region of the body where the ammonia-forming urine is released and where there is the greatest likelihood of irritation from ammonia.

The problem of diaper rash and other skin irritations due to prolonged contact with ammonia is accordingly overcome with the present invention. Almost as soon as ammonia is formed from breakdown of the urine by bacteria, the ammonia passes from the urine through the liquid-impeding barrier out of contact with the baby's skin and into contact with the ammonia-immobilizing agent where it is retained. The ammonia-immobilizing action of the construction continues as the ammonia gas is formed and released from the urine during use of the diaper. The construction preferably has a relatively large capacity for ammonia retention so that it need be replaced with a similar construction only after a conveniently long interval of time. When each diaper becomes soaked by the baby and needs to be changed, the diaper rash preventative construction can be readily removed from the diaper and reassembled with a fresh diaper or be substituted by a fresh construction of the same type.

Accordingly, the principal object in the present invention is to provide an improved ammonia-immobilizing construction. A further object of the present invention is to provide an improved method of immobilizing ammonia in a liquid-containing environment. It is also an object of the present invention to provide improved means for the prevention of diaper rash. It is still another object of the present invention to provide simple inexpensive means for deodorizing, where the odor is due to ammonia formation. Further objects and advantages of the present invention will be apparent from a study of the following detailed description and the accompanying drawings of which:

FIGURE 1 is a schematic side elevational view of a preferred embodiment of a diaper rash preventative pad in accordance with the present invention, portions being broken away to show the internal construction thereof;

FIGURE 2, illustrates the pad of FIGURE 1 in cross section, taken along the line 2—2 of FIGURE 1, in an ammonia-forming environment; and FIGURE 3 is a schematic fragmentary side elevational view of a second embodiment of the diaper rash preventative pad of the present invention.

Accordingly, the present invention essentially comprises a method of immobilizing ammonia in a liquid environment and suitable constructions for that purpose, including diaper rash preventative pads and the like.

Now referring more particularly to the accompanying drawings, a preferred embodiment of the diaper rash preventative pad is illustrated in side elevational view in FIGURE 1.

Pad 5 as illustrated in FIGURE 1, has a generally funnel shape, with a flared portion 7 integrally connected at the narrow end thereof to a narrower generally rectangular neck portion 9. The rectangular portion 9 is adapted to be disposed between the legs of the infant, while the flared portion 7 is adapted to be disposed adjacent the anterior inferior body surface, that is, near the external genitals. It will be readily understood that the pad may be of any suitable size, shape and relative proportions consistent with the objects of its use and the size and shape of the anatomical region adjacent which it is to be disposed. A typical pad of the shape illustrated in FIGURE 1 may, for example, have an overall length of approximately six inches, a width at the flared end of four or five inches and a width at the narrowed end of approximately three inches. Such a pad is usually most convenient for use on babies of, for example, 6 to 18 months of age. Other suitable sizes of the same and other shapes of pad are also contemplated.

Now referring to FIGURE 2, the pad 5 may comprise two sheets 11 and 13 joined together along edges 15 to enclose an ammonia-immobilizing agent 17 disposed on and within a carrier cloth 19, as hereinafter more fully described. The pad is disposed adjacent a liquid-containing region which also contains ammonia. Sheets 11 and 13 may be identical or non-identical. Preferably, sheets 11 and 13 are both sufficiently flexible to readily adapt to the contours of the region of the body against which they are to be disposed. Usually, in the genital region they are subjected during use to considerable bending and stretching and should preferably be sufficiently durable to undergo long continued use, yet flexible and soft enough to be comfortable when placed in such a tender region of the body. For this purpose, soft flexible plastic films have been found to be highly satisfactory. The requirements of softness may be minimized when the pad is to be inserted into the folds of a diaper or placed between two or more diapers, rather than disposed directly against the skin.

Furthermore, at least one of the sheets 11 and 13 must act as a liquid impeding barrier but should be sufficiently permeable to the passage of ammonia gas therethrough to permit ready immobilization of the ammonia gas, as it is formed, by means of the ammonia-immobilizing agent. The sheet which is moisture resistant is interposed between the liquid environment, that is, the urine, in the case of a diaper rash preventative pad, and the ammonia-immobilizing agent. For example, sheet 11 shown in FIGURE 2 as being exposed to the ammonia-forming urine, is substantially liquid impermeable but is substantially ammonia gas permeable. Preferably, sheet 13 also has the same characteristics, although this is not absolutely essential to the successful operation of some constructions. In a diaper pad, due to the travel of urine from one point to another in a diaper surrounding the pad, as by capillary action, it is advisable to have the pad envelope comprise a liquid resistant sheet entirely surrounding the ammonia-immobilizing agent of the pad.

The sheets 11 and 13 of FIGURES 1 and 2 may, for example, be a vinyl, polyisobutylene, polyethylene, polystyrene, or other suitable plastic film which either has a natural high degree of permeability to gases, particularly ammonia, or which has been specially treated, as for example, by piercing or puncturing at intervals along its length with a small pin or the like, to substantially increase the ammonia permeability thereof to the desired range, while not substantially decreasing the liquid impermeability of the sheet.

It should be understood that, instead of the plastic film, other suitable sheets may be utilized as the gas permeable, liquid-impeding substance. For example, thin films or sheets of rubber pierced in a plurality of places to increase the ammonia gas permeability while substantially retaining their moisture barrier properties are suitable for use in the pad of the present invention. Other materials will be obvious to those skilled in the art.

It should be understood that the manner of joining sheets 11 and 13 together is not limited to heat sealing to provide a sealed edge 15 but may include any other suitable conventional means of joining the sheets together such as with adhesives, by pressure sealing, or the like, compatible with the type of sheet materials utilized and effective to seal the ammonia-immobilizing agent within the pad.

The ammonia-immobilizing agent 17 illustrated in FIGURES 1 and 2 may comprise one or a compatible mixture of ammonia-absorbing, ammonia neutralizing, or other suitable means for retaining ammonia within the pad 5.

The ammonia-immobilizing agent may comprise for example, boric acid, calcium chloride, copper sulphate, suitable ion exchange resins, suitable clays having ammonia exchange capacities, ammonia-absorbing rubber compounds and the like known in the chemical processing art, and other suitable compounds. That is, the immobilizing agent may comprise any suitable agent or compatible mixture of agents capable of retaining the ammonia within the diaper rash preventative construction by chemical combination or reaction, as by neutralization, formation of coordination compounds or the like, or by physical attraction, absorption, etc., or any combination of these or similar means. The ammonia-immobilizing agent may be in any suitable form, but in the case of hygroscopic materials such as calcium chloride it is preferably in the form of granules or powder.

Boric acid, calcium chloride and copper sulphate form reaction products with ammonia. To some extent, this is also true with the ion exchange resins and clays, although these compounds may also act to physically absorb the ammonia. The action of ammonia absorbing rubber compounds varies, depending upon the type of compounds utilized.

It is preferred to provide the diaper rash preventative construction of the present invention with an ammonia-immobilizing agent which is highly effective in small concentrations, is inexpensive, and is readily available in a suitable form for use. Boric acid is preferred for use in the diaper rash preventative construction of the present invention since it is inexpensive and highly effective.

As illustrated in FIGURES 1 and 2, the ammonia-absorber may be disposed on and/or within a carrier material of extended surface area, such as a cloth 19 which cloth may be gauze, etc., or may be of any other suitable material such as paper, etc. The cloth has the effect of increasing the surface area of the ammonia-immobilizing agent and maintains the increased surface area for maximum effectiveness of the ammonia-immobilizing agent. Although it is preferred to provide the ammonia-immobilizing agent distributed within the pad 5 on the carrier cloth 19, as shown in FIGURES 1 and 2, it is also suitable to have the ammonia-immobilizing agent present within the pad exclusive of a carrier cloth. The ammonia-immobilizing agent may be present in the pad in pure form or it may be suitably diluted with a compatible inert substance, such as clay, diatomaceous earth, sand, etc., in order to increase its surface area per unit weight.

It should be understood that the liquid-impeding or moisture barrier specified in the present invention, that is, the sheets 11 and 13, is highly important to the invention. In this connection, it is generally undesirable to add to the small amount of moisture usually present initially, or to dilute, wash away, or redistribute the ammonia-immobolizing agent during use. Such dilution, washing away or redistribution may occur if the immobilizing agent is exposed to the liquid-containing environment from which the ammonia gas arises. In this connection, for example, boric acid has a maximum concentration in water of approximately 4 percent at room temperature. If boric acid were diluted to much below this point by long continued contact with urine or water, its concentration would be inadequate to assure rapid absorption of ammonia gas.

Furthermore, it is obvious that if the ammonia-immobilizing agent is handled in an essentially dry form without contact with moisture it can be utilized for an extended period of time and that handling thereof is facilitated. Specifically, if the ammonia-immobilizing agent is retained within a moisture-resistant envelope, the construction can be readily washed and reused upon each diaper change, whereas this is not the case if the ammonia-immobilizing agent is exposed to urine and excrement. Furthermore, with such a construction, the concentration of the ammonia-immobilizing agent can be accurately controlled. In addition, no separate provision need be made for maintaining the ammonia-immobilizing agent out of contact with the skin. In this regard, many suitable economical ammonia-immobilizing agents, for example, calcium chloride and copper sulphate, may be somewhat unsuitable for direct contact with the skin, clothing, diapers or other media utilized adjacent the genital regions of babies. In addition, some of the suitable ammonia-immobilizing agents require a substantially moisture-free environment for adequate ammonia absorption, for example, calcium chloride. Accordingly, the liquid-impeding or moisture barrier is an essential feature in the construction of the present invention.

Furthermore, a suitable indicator, such as color indicator 18, illustrated in FIGURES 1 and 2, may be added directly to and distributed with the ammonia-immobilizing agent in the diaper rash preventative construction, for example, in the form of a powder or the like, or may be disposed within one or more localized areas of the construction, on a paper strip, etc. Such an indicator is present adjacent the ammonia-immobilizing agent to indicate exhaustion or approaching exhaustion of the ammonia-immobilizing powers of such an agent. In many instances, the presence of urine and other substances, as well as water, would materially interfere with the functioning of the dye indicator, either by dilution of or reaction with the indicator. Accordingly, the color indicator 18 is protected by the moisture barrier.

The color indicator may be, for example, phenol red (color range pH 6.4–8.0), which is phenolsulfonthalein, neutral red (color range pH 6.8–8.0), which is dimethyl diamino phenazine chloride, methyl red, which is para-dimethyl aminoazobenzene carboxylic acid, or any one of a number of other suitable pH indicators, for example, phenophthalein or bromthymol blue. When the ammonia-immobilizing agent approaches saturation, some excess ammonia is usually present in the pad in the form of ammonium hydroxide. That is, it is combined with a portion of the moisture usually present within the pad. The ammonium hydroxide in turn is ionized and in the ionized state reacts with the pH indicator to turn it a color which clearly indicates the presence of the excess ammonia and the desirability of obtaining a fresh pad. Obviously, where the indicator is a color indicator, at least the portion of the pad construction which includes the indicator should be transparent.

Experiments have been conducted to determine the concentration of ammonia-immobilizing agent which is usually necessary in a pad of the construction illustrated in FIGURES 1 and 2. In this connection, it has been found that the average daily excretion of urea from a baby of diaper-wearing age may be, for example, about 30 grams. Calculating the sleeping period for the baby as a twelve-hour period, the theoretical maximum amount of ammonia which could be produced during this twelve-hour interval from 15 grams of urea is approximately 8 grams of ammonia. This, of course, assumes 100 percent efficient conversion of urea to ammonia by bacteria. In practice, the amount of ammonia produced is considerably less during such a twelve-hour period.

Under actual test conditions, it was found that quantities of boric acid of the order of about 0.5 gram were ineffective to absorb during a twelve-hour period all of a quantity of 0.5 gram of ammonia gas added in the form of a dilute solution of ammonium-hydroxide to the surface of a diaper rash preventative pad, generally of the construction illustrated in FIGURES 1 and 2. However, it has been determined that under similar circumstances, a pad containing two grams or more of boric acid was capable of relatively rapidly absorbing all of approximately 500 miligrams of ammonia gas within a period of nine hours. Due to the relatively low cost of boric acid and other diaper rash preventative agents, amounts of such agents of several ounces or more per pad are usually utilized.

Clearly, the minimal effective concentration of an ammonia immobilizing agent within a diaper rash preventative pad will necessarily depend upon the size of the pad, the amount of ammonia to which the pad is to be exposed, the rate of introduction of ammonia into the pad, the particular ammonia-immobilizing agent selected and the total surface area presented by the ammonia-immobilizing agent, as well as other factors, and can readily be determined empirically by one skilled in the art.

It should be understood that instead of having the ammonia-immobilizing agent within a carrier cloth in the pad 5 as illustrated in FIGURES 1 and 2, such agent may be disposed in restricted areas within the pad, as by quilting portions of the pad, etc. Such quilted areas may be provided by sealing, as by heat, etc., the outer sheets of the pad together in restricted areas.

Such an arrangement is illustrated in FIGURE 3 of the accompanying drawings, wherein a diaper rash preventative pad 23 is provided which comprises an envelope 25 of thermoplastic or other suitable film having a plurality of sealed areas 27, including a sealed outer edge. The sealed areas define a plurality of pockets 29, each of which contains an ammonia-absorbing agent 31 in finely divided form. With this arrangement, the surface area of the ammonia-absorbing agent 31 is stabilized, so that clumping and packing of such agent do not occur. A plurality of apertures 33 may also be provided in the sealed areas 27, as illustrated in FIGURE 3, to allow unrestricted passage of liquid therethrough while maintaining the ammonia-absorbing agent 31 substantially dry. These apertures are particularly advantageous in pads which are to be worn directly against the skin of the baby in the genital region, since they permit ready passage of urine therefrom without restriction by the body of the pad.

Other modifications of the construction of the pad of the present invention can be readily made to particularly adapt the pad to such uses as diaper pail liners and the like.

As an example of the method of the present invention, a simple and inexpensive yet effective diaper rash preventative pad was constructed. In this connection, two sheets of polyethylene film, 0.025 mm. in thickness and having approximately 10 apertures of average diameter of about 0.05 mm. per square inch therein, were cut to the shape illustrated in FIGURE 1 and to a size of about 7 inches in length, 5 inches in maximum width and 3 inches in minimum width. Thereafter they were heat sealed together. Before the heat sealing was completed, however, a quantity of cotton gauze, which was sufficient to form when folded upon itself a pad approximately ¾ inch thick and of approximately the same size and shape as described for the sheets, was soaked in a hot (approximately 200° F.) saturated water solution of boric acid, the solution having an approximate boric acid concentration of over 30 percent by weight. The gauze was then dried and folded to an appropriate size, and thereafter inserted between the two sheets of polyethylene film. By this means, an approximately 30 gram amount of boric acid was uniformly disposed within and on the surface of the gauze, presenting a considerable total surface area within the pad for rapid, uniform absorption of ammonia. The sealing was then completed to form a moisture barrier of the polyethylene film around the boric acid impregnated in the gauze.

The pad had a sufficiently high ammonia gas transmission rate so that when it was placed adjacent the genitals of a child of six months after having been wrapped in the folds of a single diaper, the child was protected from diaper rash over a 12 day test period of time. The pad was used 24 hours a day, being transferred from diaper to diaper as needed.

At the end of the twelve-day test period the baby was examined for diaper rash and no rash was discerned. Moreover, the diaper rash which had been present on the baby's genitals before the test period had cleared up. In addition, the pad still exhibited ammonia-absorbing properties. Furthermore, it was noted that during the test period, the pad substantially wholly eliminated the usual ammonia aroma associated with used diapers.

As a second example, a pad similar to that just described was constructed of polystyrene film having a high permeability to ammonia vapor but being substantially impermeable to the transmission of water therethrough. However, the gauze was eliminated from the pad, calcium chloride powder being disposed in an amount of about 100 grams between the sheets of the pad with no carrier cloth present. A phenol red color indicator was uniformly dispersed in the calcium chloride before the latter was disposed within the pad. The pad was fabricated in the form of a long rectangular liner for a diaper pail. This liner was utilized over a two-week period within the diaper pail in constant contact with moisture and used diapers.

It was found that for the entire two-week test period the liner did substantially wholly eliminate the odor of ammonia from the diaper pail and that at the end of the two-week period the liner still had not become saturated with ammonia, as indicated by the phenol red.

From the foregoing, it will be seen that an economical, efficient and highly useful product is provided, in accordance with the present invention, which product eliminates and prevents diaper rash over an extended period of time and, moreover, which is effective as a deodorizer for use in eliminating ammonia odor. Other advantages are as set forth in the foregoing.

It will be understood that other materials may be added to the pad as desired and so long as they are compatible with the ammonia-immobilizing agent, color indicator, moisture barrier, etc. In this connection, scent imparting substances, such as perfumes may be employed to mask other odors associated with urine, etc. Chloraphyllic substances can also be used to reduce or eliminate such odors. Other materials are also contemplated.

Such other modifications of the diaper rash preventative construction and diaper pail means of the present invention and of the method and steps of the present invention as are within the skill of those versed in the art are contemplated as being within the scope of the present invention.

I claim:

1. The method of immobilizing ammonia from a liquid-containing environment, which method comprises the steps of providing an ammonia-immobilizing agent and disposing a liquid-impeding barrier between an ammonia- and liquid-containing environment and said ammonia-immobilizing agent, said liquid-impeding barrier being permeable to the passage therethrough of ammonia gas, whereby ammonia gas liberated from said environment passes through said barrier and is retained with said ammonia-immobilizing agent.

2. The method of immobilizing ammonia from a liquid-containing environment, which method comprises the steps of providing an ammonia-immobilizing agent and disposing a liquid-impeding barrier between said ammonia-immobilizing agent and an ammonia-liberating liquid environment, said liquid-impeding barrier having a sufficiently high permeability to ammonia gas, whereby ammonia gas liberated from said environment substantially immediately passes through said liquid-impeding barrier into contact with said ammonia-immobilizing agent and is immobilized thereby.

3. The method of immobilizing ammonia from a liquid-containing environment, which method comprises the steps of providing an ammonia-immobilizing agent and disposing a liquid-impeding barrier between an ammonia- and liquid-containing environment and said ammonia-immobilizing agent, said ammonia-immobilizing agent being in the form of a granular solid and said liquid-impeding barrier being in the form of an envelope within which said ammonia-immobilizing agent is disposed, the said envelope having a high permeability to the passage therethrough of gases, particularly ammonia gas, whereby ammonia gas liberated from said environment passes through said envelope and is retained with said ammonia-immobilizing agent.

4. The method of immobilizing ammonia from a liquid-containing environment, which method comprises the steps of disposing a liquid-impeding barrier between an ammonia-liberating liquid environment and boric acid powder, said barrier being in the form of an envelope wholly disposed around said boric acid powder and having a high permeability to the passage therethrough of ammonia gas, whereby said ammonia gas liberated from said environment and passing through said barrier is retained by said boric acid powder.

5. The method of immobilizing ammonia from a liquid-containing environment, which method comprises the steps of disposing a liquid-impeding barrier between an ammonia-liberating liquid environment and calcium chloride powder, said barrier being in the form of an envelope wholly disposed around said calcium chloride powder and having a high permeability to the passage therethrough of ammonia gas, whereby said ammonia gas liberated from said environment and passing through said barrier is retained by said calcium chloride powder.

6. An improved diaper rash preventative pad for combination with a baby diaper, said pad comprising an envelope, at least a portion of which is of liquid-impeding material and at least a portion of which is permeable to the passage of gas therethrough, particularly ammonia gas, and an ammonia-immobilizing agent disposed within said envelope.

7. An improved diaper rash preventative pad for combination with a baby diaper, said pad comprising an outer envelope, at least a portion of which is a flexible, moisture-resistant, gas-permeable film, and an ammonia-immobilizing agent in solid state, disposed within said envelope.

8. An improved diaper rash preventative pad for combination with a baby diaper, said pad comprising an outer envelope of moisture-resistant, flexible plastic film which has a high degree of permeability to the passage therethrough of ammonia gas and disposed within said envelope boric acid powder as an ammonia-immobilizing agent for said pad.

9. An improved diaper rash preventative pad for combination with a baby diaper, said pad comprising an outer envelope of moisture-resistant, flexible plastic film which has a high degree of permeability to the passage therethrough of ammonia gas and disposed within said envelope calcium chloride powder as an ammonia-immobilizing agent for said pad.

10. An improved diaper rash preventative pad for combination with a baby diaper, said pad comprising an outer envelope of moisture-resistant flexible plastic film having a high degree of permeability to the passage therethrough of ammonia gas, at least a portion of said film being transparent, and a mixture of solid granular ammonia-immobilizing agent and a pH color indicator disposed wholly within said envelope.

11. An improved diaper rash preventative pad for combination with a baby diaper, said pad comprising an outer envelope of moisture resistant, flexible material, said envelope being sealed in a manner to provide a plurality of non-communicating pockets, ammonia-immobilizing agent disposed within each of said pockets, said envelope also having a plurality of passageways distributed over a substantial proportion of said envelope and extending through said envelope out of communication with said ammonia-immobilizing agent.

12. An improved diaper rash preventative pad for combination with a baby diaper, said pad comprising an outer envelope of moisture-resistant flexible film having a high degree of permeability to the passage therethrough of ammonia gas, and a carrier material of extended surface area impregnated with an ammonia-immobilizing agent in a solid state, said carrier material being wholly disposed and sealed within said envelope.

13. An improved diaper rash preventative pad for combination with a baby diaper, said pad comprising an outer envelope of moisture-resistant, flexible plastic film having a high degree of permeability to the passage therethrough of ammonia gas, at least a portion of said film being transparent, and a carrier cloth of gauze having an extended surface area, said cloth being impregnated with a mixture of ammonia-immobilizing agent and a pH color indicator, said cloth being wholly disposed within said envelope.

14. An improved diaper rash preventative diaper, comprising a moisture absorbent baby diaper and a diaper rash preventative pad disposed within said diaper, said pad comprising an envelope, at least a portion of which is of liquid-impeding material and at least a portion of which is permeable to the passage of ammonia gas, and an ammonia-immobilizing agent disposed within said envelope, said liquid-impeding portion and said ammonia gas permeable portion being disposed within said diaper in a position to approximate the urine source when said diaper is worn.

References Cited in the file of this patent
UNITED STATES PATENTS

| | | |
|---|---|---|
| 2,023,251 | Stein | Dec. 3, 1935 |
| 2,397,751 | Rand | Feb. 28, 1945 |
| 2,468,445 | Hurst | Apr. 26, 1949 |
| 2,643,969 | Mahon | June 30, 1953 |